US007775539B2

United States Patent
Menayan (10) Patent No.: US 7,775,539 B2
(45) Date of Patent: Aug. 17, 2010

(54) METHOD AND DEVICE FOR CONNECTING STRUCTURAL PARTS

(75) Inventor: Jesse M. Menayan, 318 Holladay Ave., San Francisco, CA (US) 94110

(73) Assignee: Jesse M. Menayan, San Francisco, CA (US)

(*) Notice: Subject to any disclaimer, the term of this patent is extended or adjusted under 35 U.S.C. 154(b) by 687 days.

(21) Appl. No.: 11/726,134

(22) Filed: Mar. 20, 2007

(65) Prior Publication Data

US 2008/0088113 A1    Apr. 17, 2008

Related U.S. Application Data

(60) Provisional application No. 60/852,133, filed on Oct. 16, 2006.

(51) Int. Cl.
*B62K 3/02* (2006.01)
(52) U.S. Cl. .................................. 280/287; 280/278
(58) Field of Classification Search ................ 280/287, 280/278, 87.05; 403/348–353
See application file for complete search history.

(56) References Cited

U.S. PATENT DOCUMENTS

| | | | | |
|---|---|---|---|---|
| 13,112 A * | 6/1855 | Waterhouse | ................. | 285/362 |
| 1,130,726 A * | 3/1915 | Greve | ......................... | 285/376 |
| 1,682,187 A * | 8/1928 | Saunders | ..................... | 285/376 |
| 2,189,056 A * | 2/1940 | Carington | ................... | 403/348 |
| 3,304,099 A * | 2/1967 | Jankowski | .................. | 280/287 |
| 3,411,814 A * | 11/1968 | Dillon | ........................ | 285/340 |
| 4,824,131 A * | 4/1989 | Thay | .......................... | 280/278 |
| 5,069,468 A * | 12/1991 | Tsai et al. | ................... | 280/278 |
| 5,312,125 A * | 5/1994 | Tsao | .......................... | 280/287 |
| 6,135,478 A * | 10/2000 | Montague | ................... | 280/287 |
| 7,232,376 B2 * | 6/2007 | Droppleman | ............... | 473/288 |
| 7,584,977 B2 * | 9/2009 | Huang | ........................ | 280/278 |
| 2009/0256330 A1 * | 10/2009 | Daniels | ..................... | 280/287 |

* cited by examiner

*Primary Examiner*—Tony H. Winner (57) ABSTRACT

The preferred embodiment relates a method and device for joining structural members together, in a substantially transverse or in-line orientation, without the use of tools. This method and device can be used to join the structural members of a bicycle frame together, forming one or more sub-assemblies that can be easily disassembled or knocked down by hand for fast and easy shipping or storage. The current state of the art with knockdown bicycle frames requires detailed knowledge of bicycle assembly and components as well as a substantial amount of time to do so. The preferred embodiment does not require the use of specific tools and allows the novice to knockdown and re-assemble a bicycle frame in a few minutes, providing a quick, simple, and affordable way to temporarily store, ship, or travel with a bicycle. In addition to joining the structural members of a bicycle frame, this method and device can be used for various applications requiring a simple and quick way to join in-line or transverse structural members together without the use of tools.

2 Claims, 11 Drawing Sheets

METHOD AND DEVICE FOR CONNECTING STRUCTURAL PARTS

CROSS-REFERENCE TO RELATED APPLICATION

This application claims priority from U.S. Provisional Application No. 60/852,133 filed on Oct. 16, 2006, which is incorporated herein in its entirety.

BACKGROUND OF THE INVENTION

Figure 8:
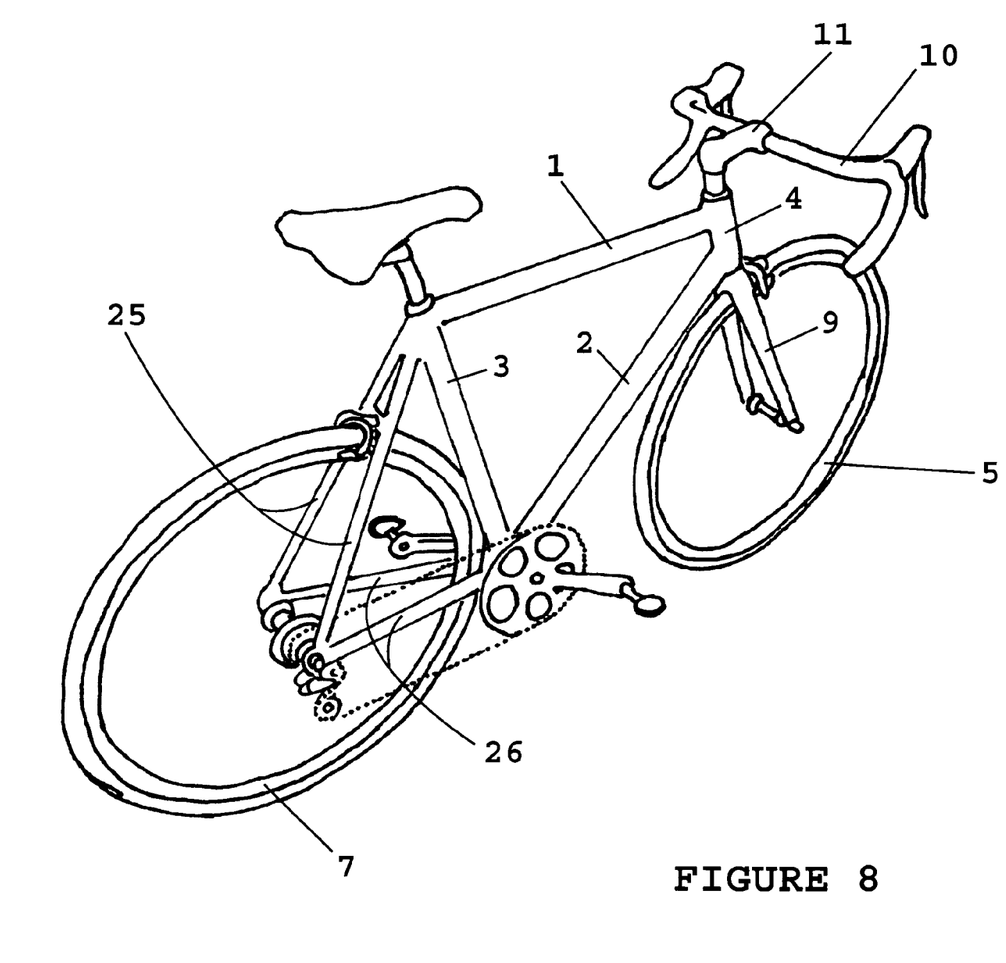
FIG. 8 shows a standard bicycle

Structural members are typically joined together in a permanently fixed way by the use of welding, bonding, or mechanical fasteners, all which require specific tools for assembly and dis-assembly. In the construction of an ordinary bicycle frame, structural members are welded or permanently bonded together at specific angles to form a fixed triangular frame. FIG. 8 shows a conventional bicycle. The major members of a bicycle frame are the top tube 1, down tube 2, seat tube 3, rear stays 25, chain stays 26, bottom bracket 28, and head tube 4. The fixed joint bicycle frame is assembled together with wheels, handlebar, pedals, gears, and other components to create a ride-able bicycle. The head tube assembly is made up of the fork 9, which passes through head tube 4, is attached to stem 11 and is clamped to handlebars 10. The head tube assembly can be complicated to assemble or disassemble and requires adequate knowledge of the bicycle, skill, and specific tools.

With the advent of air travel, more and more cyclists are traveling with their bicycles on airplanes to various destinations. Disassembling a bicycle for air travel or shipment can be costly, complicated, require the knowledge, skills, and tools of bicycle assembly, and demand a lot of time. The large size of a fixed joint bicycle frame design can make it difficult to disassemble and require expensive over-sized packaging for shipping, traveling by airplane, or temporary storage. A bicycle frame making use of a unique structural joint design that allows for fast, compact, and easy dis-assembly, without the use of tools, is very much needed. It would be ideal for this joint design to enable the head tube assembly to remain intact in order to reduce dis-assembly/assembly time and complexity.

The object of the preferred embodiment is to provide a quick release joint design that can be applied to the structural members of a bicycle frame. This connection method will enable a regular bicycle to be knocked down or dismantled into several smaller assemblies in only several minutes, requiring no tools or knowledge of bicycle assembly, thus allowing it to be packed into a case that is small enough for cheap and easy shipping, air travel, or storage.

BRIEF SUMMARY OF THE INVENTION

The preferred embodiment relates a method and device for connecting structural members together without the use of tools. This method and device can be used to join the tubular members of a bicycle frame together, forming one or more sub-assemblies, which can be easily disassembled by hand for fast and easy shipping or storage. In addition to joining the structural members of a bicycle frame, this method and device can be used for various applications requiring a simple and quick way to join in-line or transverse structural members together without the use of tools. The current state of the art with bicycle frames requires complex dis-assembly procedures and prior knowledge of bicycle assembly in order to take apart and pack a bicycle into a shippable or airline sized suitcase. The preferred embodiment allows for a bicycle frame design that can be disassembled and assembled in minutes, with no tools or prior knowledge of bicycle assembly. This method and device allows the large size of a bicycle frame to be knocked down into smaller sub-assemblies enabling the compact, efficient, and affordable transport of a standard bicycle.

DETAILED DESCRIPTION OF THE INVENTION

Figure 1:
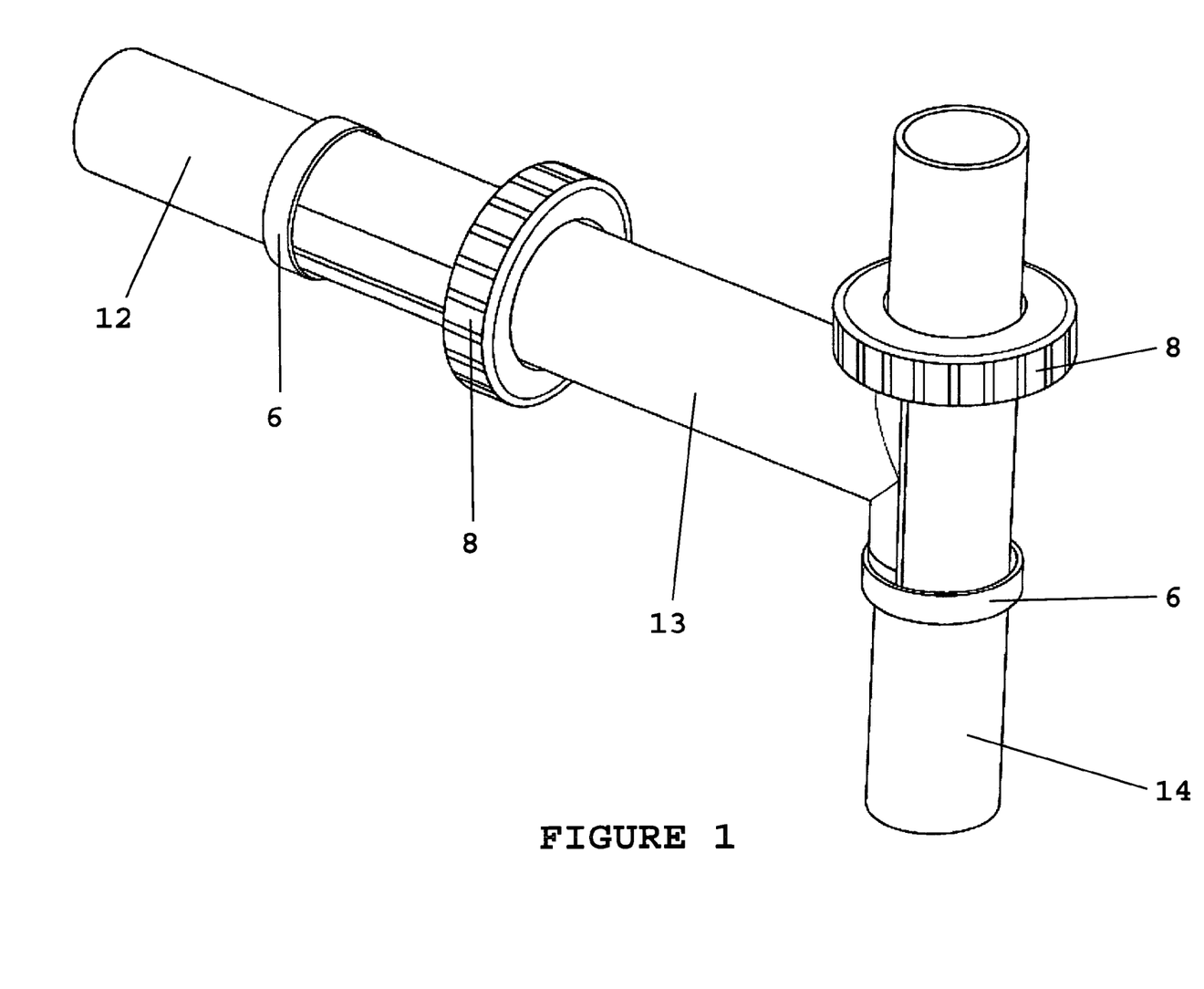
FIG. 1 shows the preferred embodiment in a closed double joint configuration

FIG. 1 depicts the preferred embodiment being applied to both an in-line joint and a transverse joint of structural members 12, 13, and 14. Both joints shown are in a closed position. The left side of the figure shows the closed in-line joint while the right side of the figure illustrates the closed transverse joint. For the in-line joint, structural member 12 is joined to structural member 13. For the transverse joint, structural member 13 is joined to structural member 14.

Figure 2:
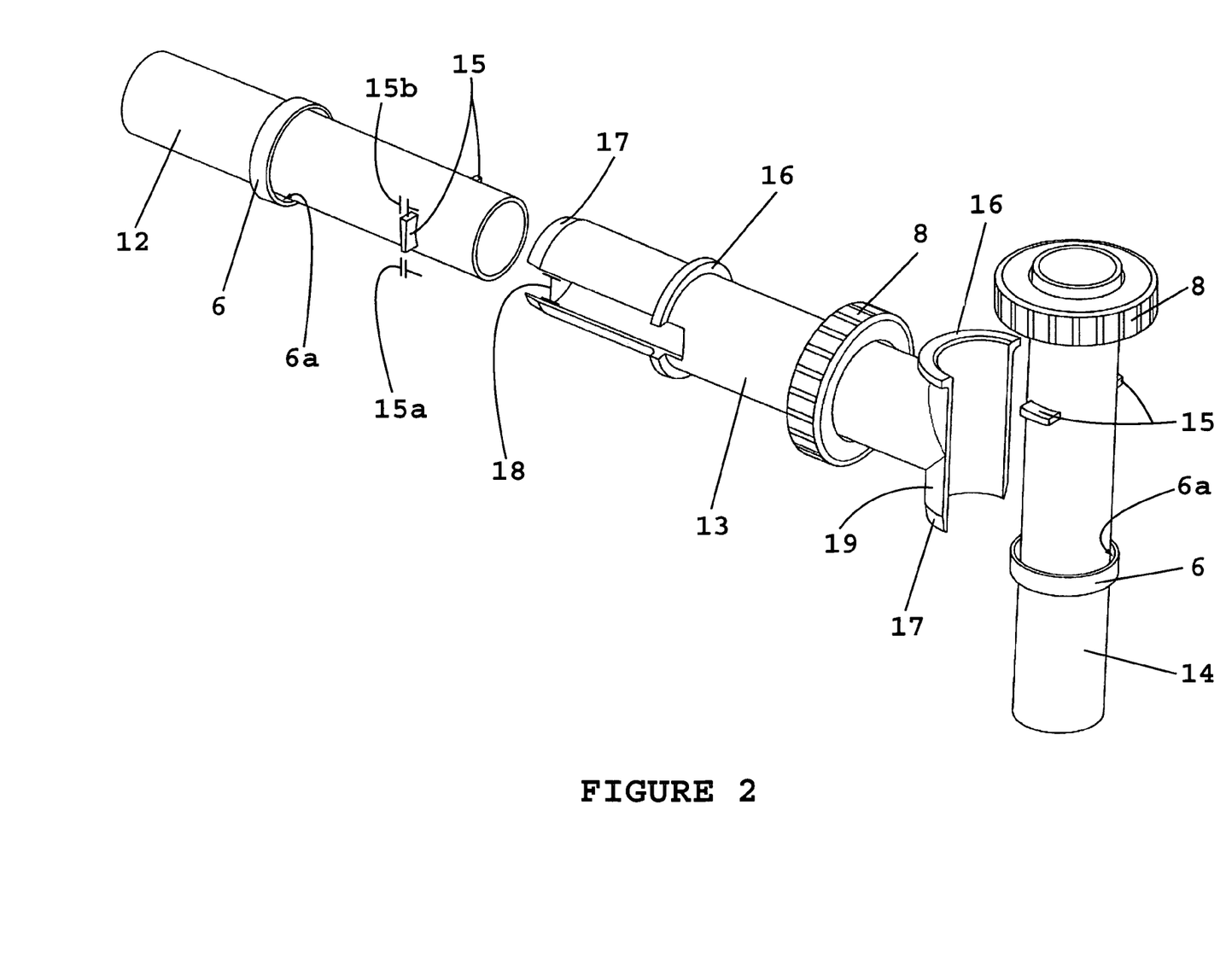
FIG. 2 shows the preferred embodiment in an open double joint configuration

FIG. 2 represents the same joints as FIG. 1, but in a fully opened position where we can see the individual components of the preferred embodiment. Member 12 has a radial ring 6 with interior pocket 6a, fixed on the outside surface of one end. On the other end of member 12 are two tapered wedge protrusions 15 extending radially outwards from the member. Each protrusion is tapered so that one side 15a is narrow while other side 15b is wider, thus forming a taper. This specific example makes use of two tapered wedge protrusions. However, the preferred embodiment will work with one, two, or multiple tapered wedge protrusions. Structural member 12 is designed in slide axially into structural member 13. At the left end of member 13 is a slot 18 to accommodate tapered wedge 15. Member 13 has an inward tapered end 17, which fits into radial ring 6 and radially inward pocket 6a on member 12. Sliding axially on member 13 is rotatable ring 8. Also fixed on member 13 is radially outward protrusion 16. Protrusion 16 prevents prevents ring 8 from sliding towards the slotted end of structural member 13. Similar to the in-line joint pictured on the left side of FIG. 2, the transverse joint uses many of the same components. Member 19 is fixed to member 13 in a substantially transverse orientation. The top end of member 19 has radially outward protrusion 16 and the inward taper 17 at the bottom end. The inside surface of member 19 is shaped so that it fits perfectly over the outside surface structural member 14. Member 14 has radial ring 6 with interior pocket 6a, fixed to the outside surface of one end. The other end of member 14 has tapered wedge protrusions 15.

Figure 3:
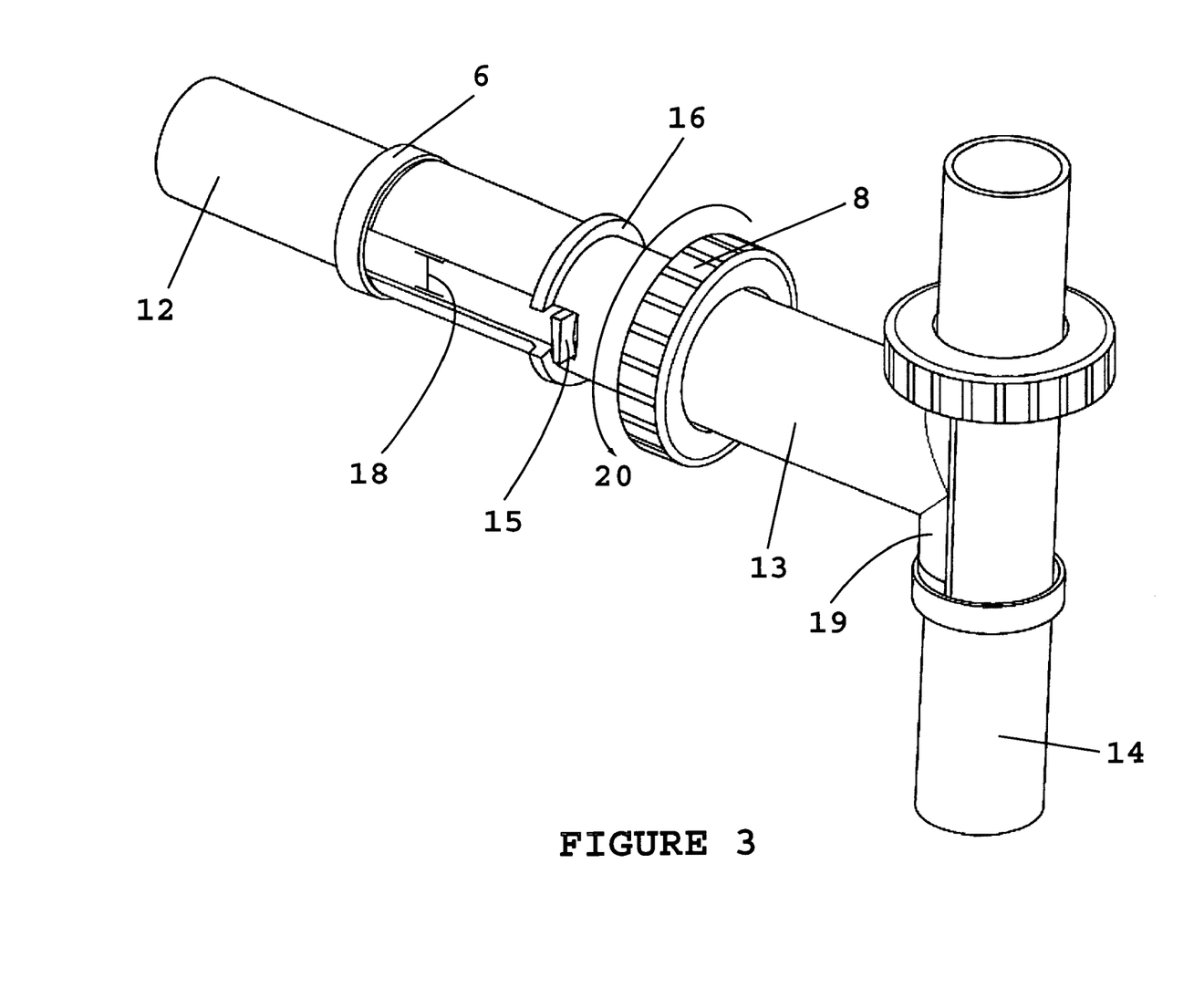
FIG. 3 shows the preferred embodiment opening in an in-line orientation

FIG. 3 shows the in-line joint on the left side partially open. Ring 8 has been rotated in direction 20 to release itself from tapered wedge 15 and moved axially along member 13 to the right. In this particular example, ring 8 is rotated counter-clockwise to release itself from tapered wedge 15. However, tapered wedge 15 can be configured so that ring 8 must be rotated either clockwise or counterclockwise to release itself. Tapered wedge 15 is located at the far right of slot 18. Inward taper 17 (not shown) is tucked inside the pocket of radial ring 6.

Figure 4:
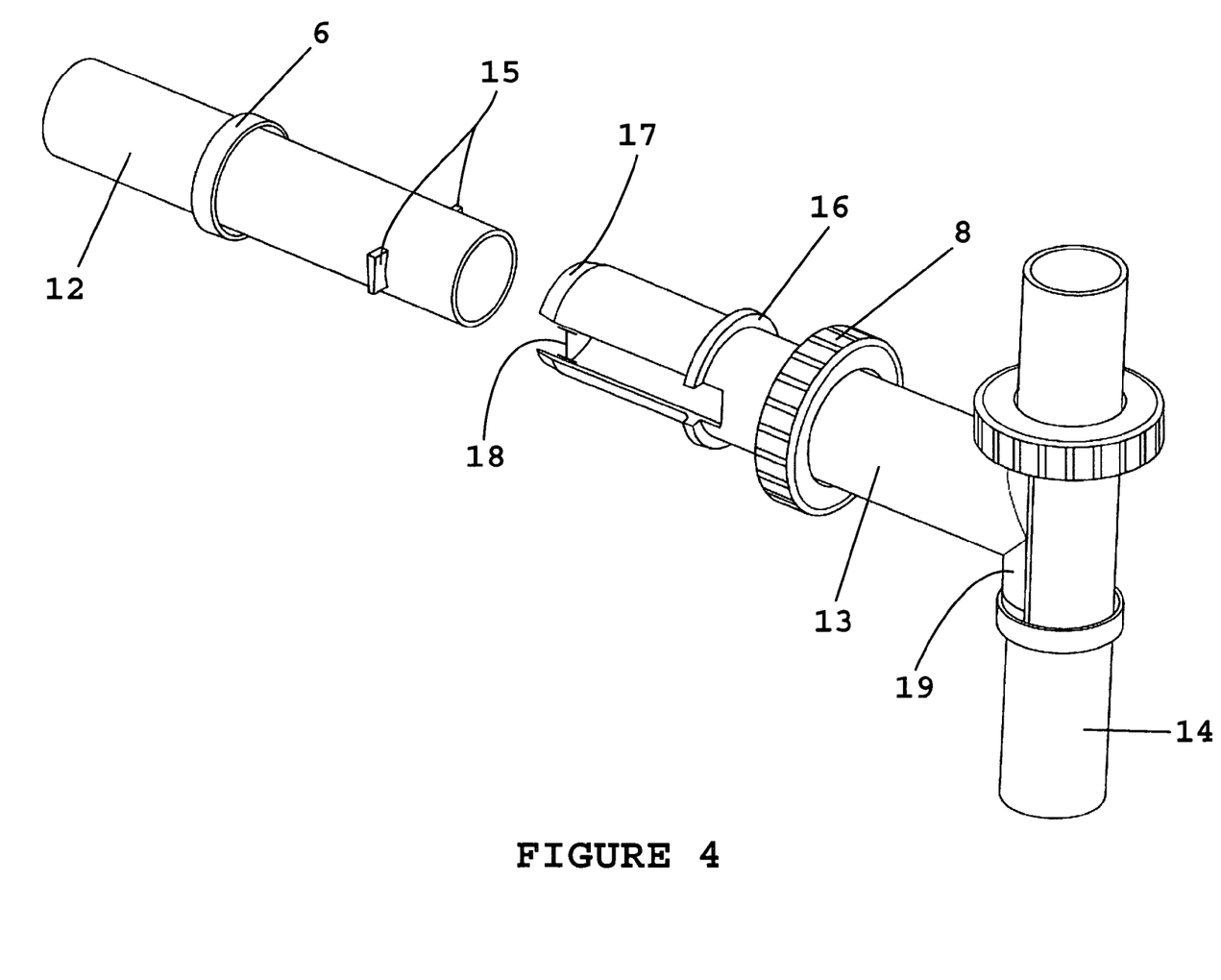
FIG. 4 shows the preferred embodiment fully opened in an in-line orientation

FIG. 4 shows the in-line joint fully open. Inward taper 17 has released itself from the inside pocket of radial ring 6. Tapered wedge 15 has moved axially along slot 18 to the left until member 12 has fully separated itself from member 13.

Figure 5:
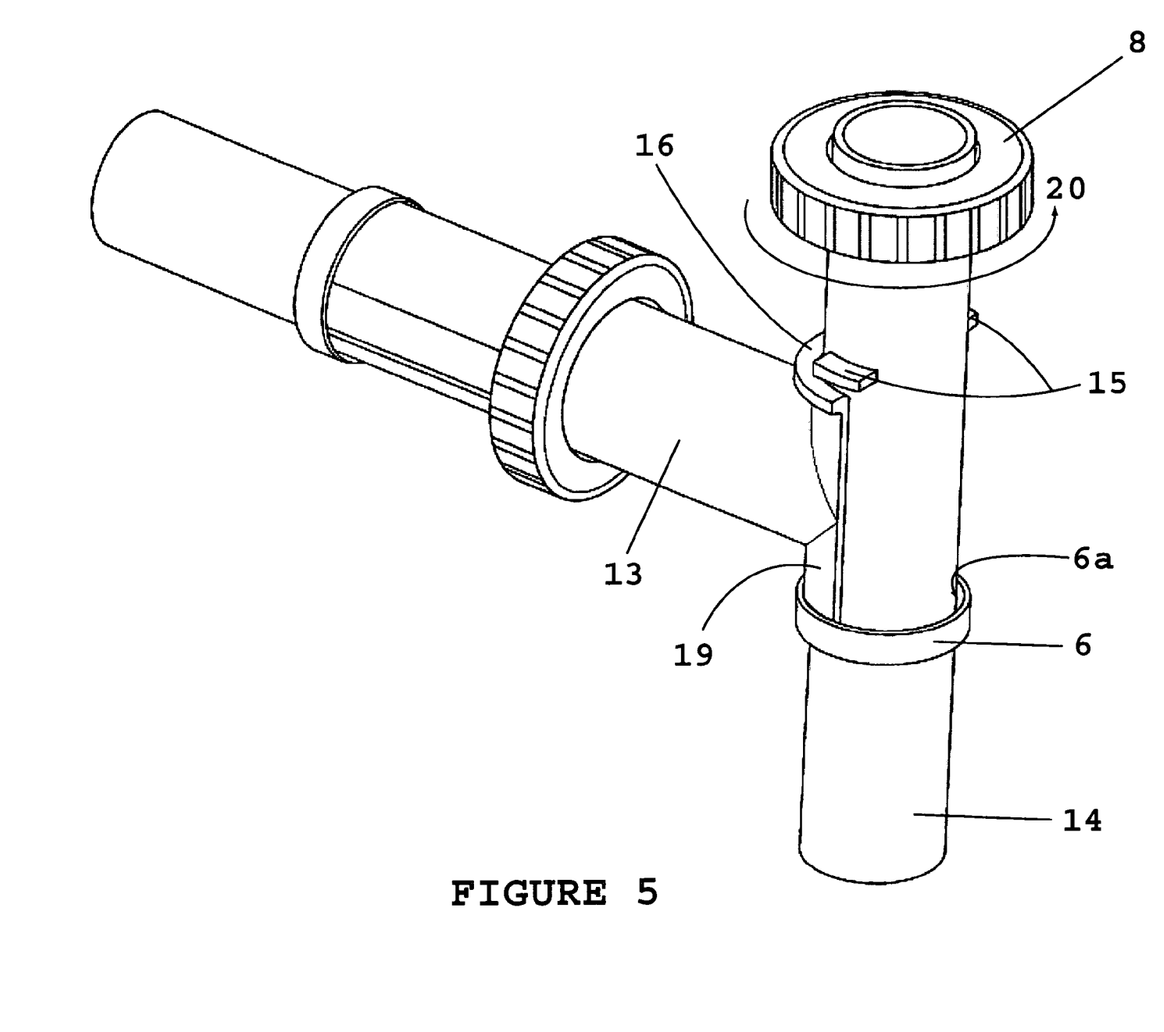
FIG. 5 shows the preferred embodiment opening in a transverse orientation

FIG. 5 shows the transverse joint of the preferred embodiment partially open. On the right side of the figure, ring 8 has been rotated in direction 20 to release itself from tapered wedge 15 and moved axially up to the top of member 14. Member 19 is fixed to structural member 13 and mated around member 14. Inward taper 17 (not shown) of member 19 is tucked into the interior pocket 6a of radial ring 6.

Figure 6:
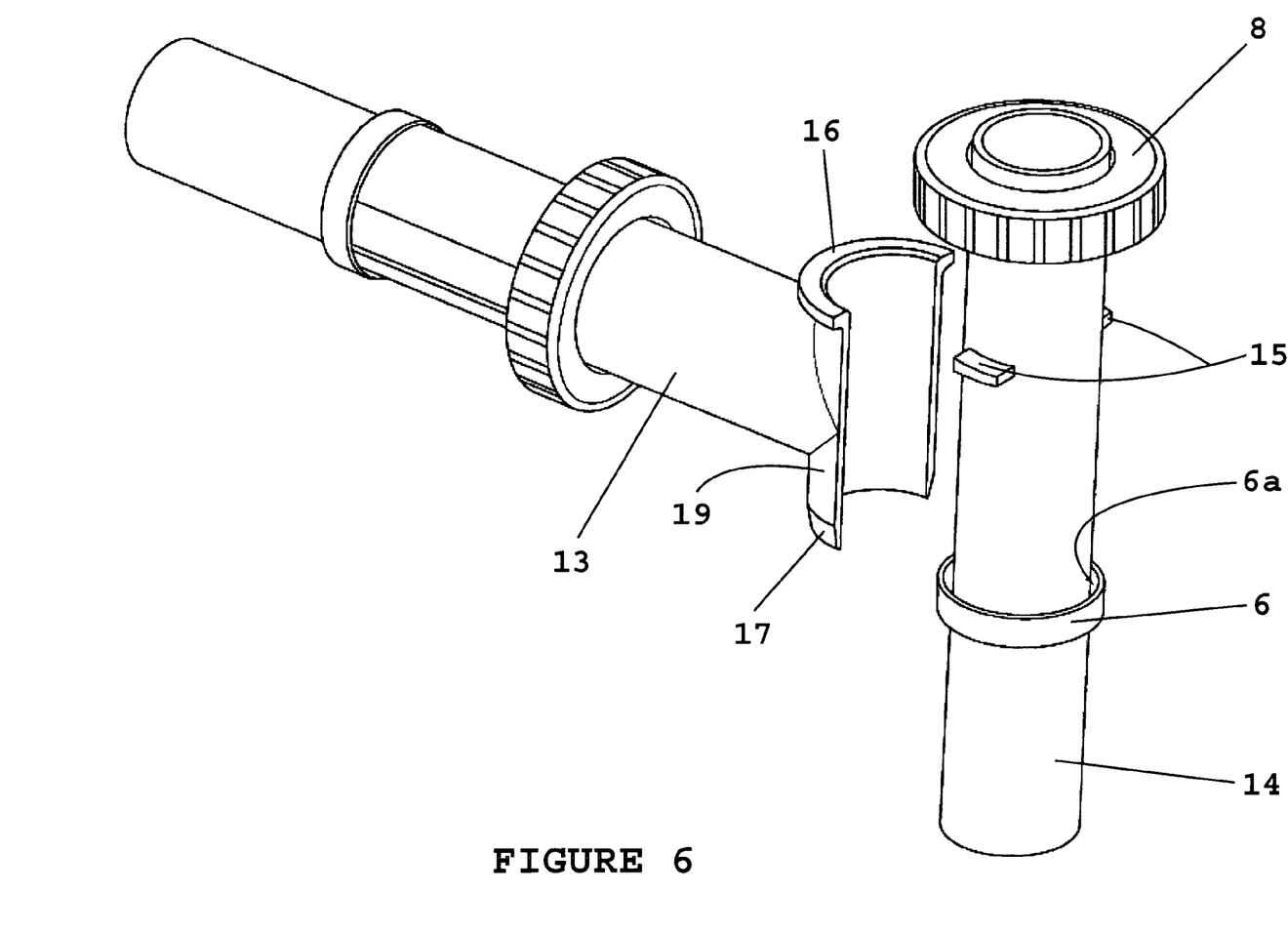
FIG. 6 shows the preferred embodiment fully opened in a transverse orientation

FIG. 6 shows the transverse joint fully open. Member 19 has parted itself from structural member 14 by removing inward taper 17 from interior pocket 6a of radial ring 6.

Figure 7A:
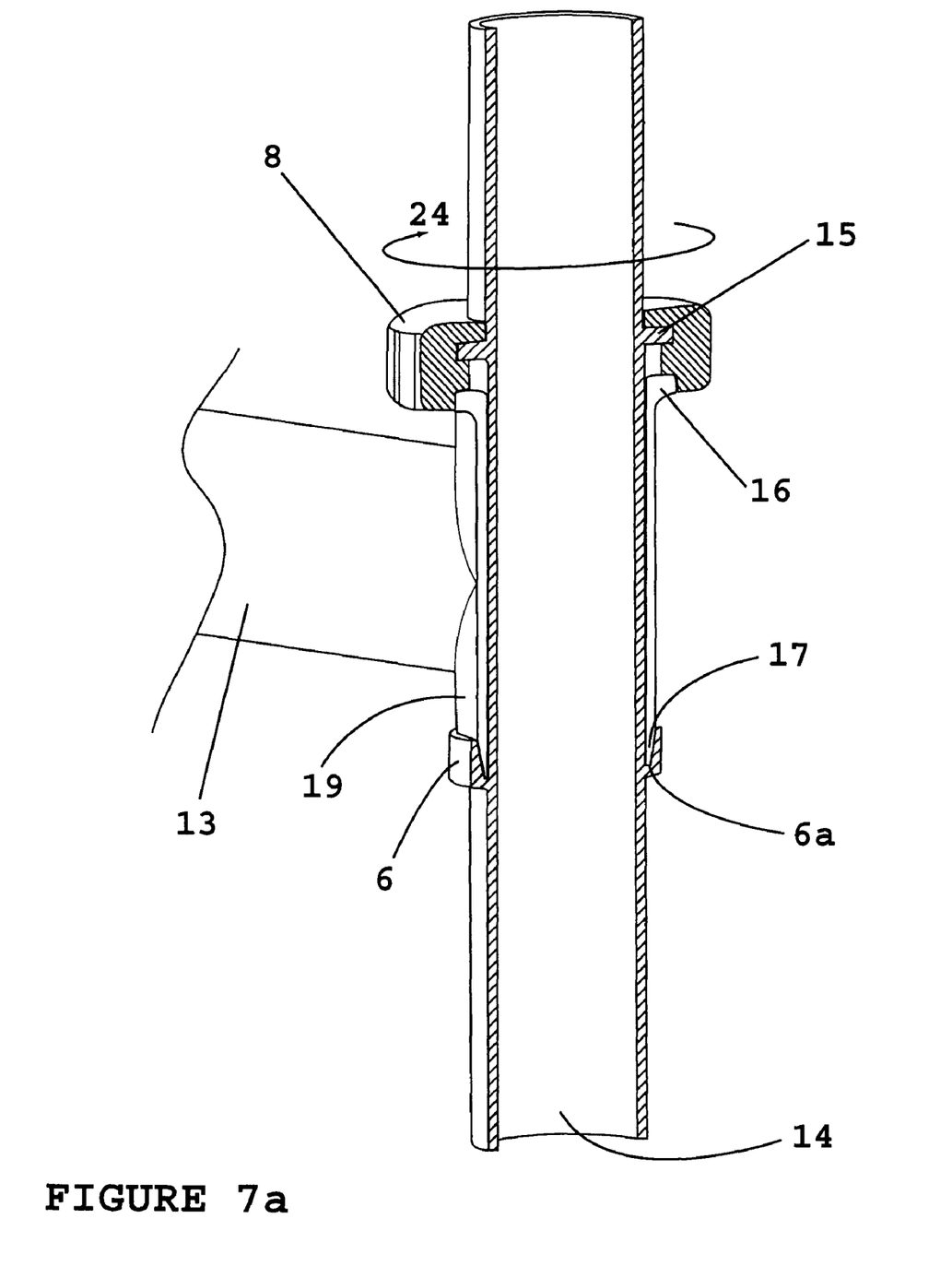
FIG. 7a shows a cross-sectional view of the preferred embodiment

FIG. 7a shows a cross-section view of the fully closed transverse joint. Ring 8 is rotated in direction 24 until tapered wedge 15 is completely locked between interior groove 22 of FIG. 7b. Inward taper 17 is completely tucked into the inside pocket 6a of radial ring 6. Member 19 is fully mated around the outside surface of structural member 14.

Figure 7B:
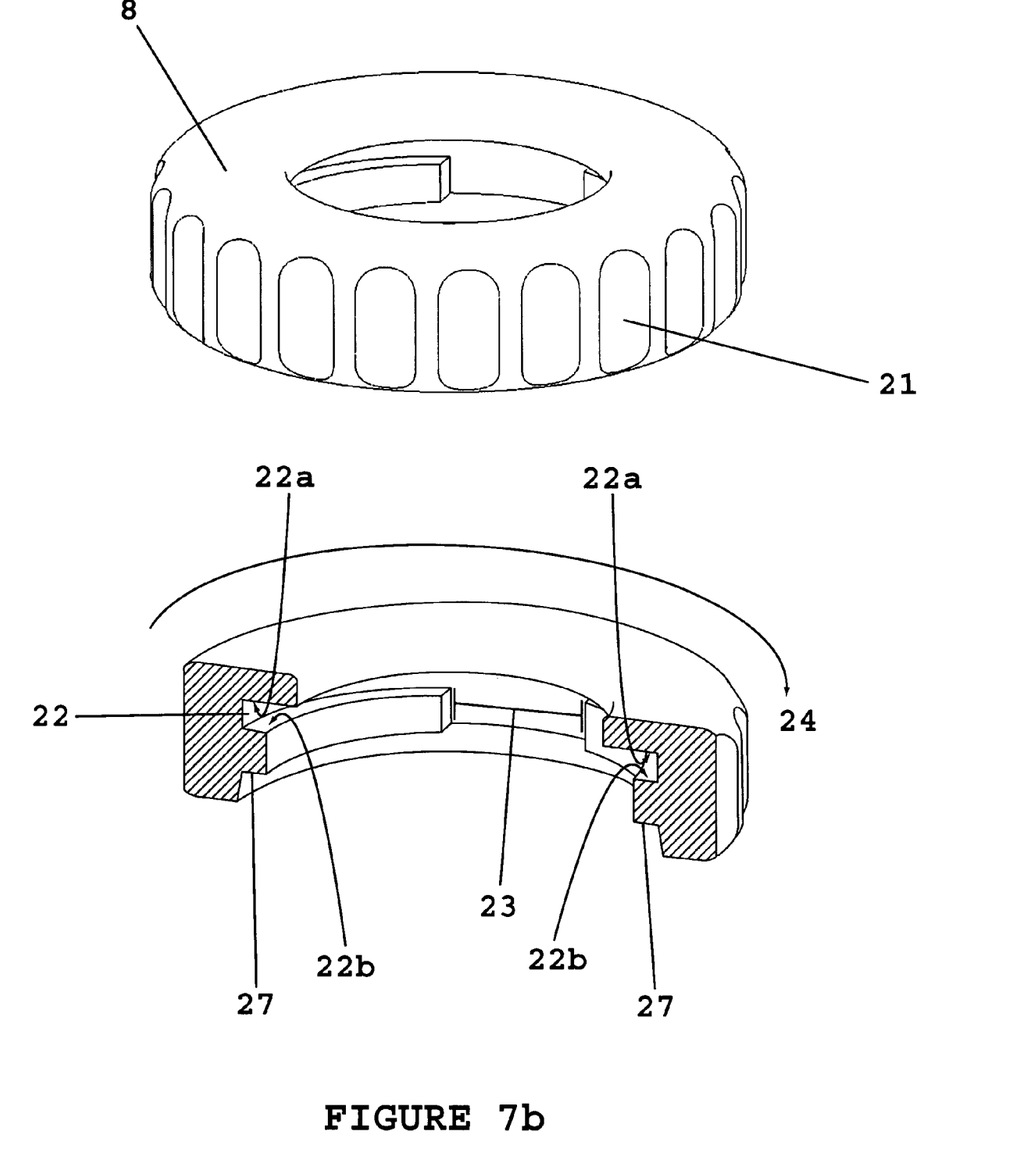
FIG. 7b shows a detail and cross-sectional view of rotatable ring member of preferred embodiment

FIG. 7b shows a cross-section view of ring 8. The outside surface 21 of ring 8 has a textured pattern to increase grip and friction. The interior tapered groove 22 of ring 8 is made of locking surfaces 22a and 22b. Gap 23 allows tapered wedge 15 to slide up into the interior tapered groove 22. As tapered wedge 15 slides through gap 23 and into interior groove 22, locking surface 27 of ring 8 makes contact with the top surface of protrusion 16. Protrusion 16 prevents ring 8 from moving downwards toward radial ring 6. At gap 23, the distance between surface 22a and 22b is at its widest distance. Starting at gap 23, surface 22b tapers upwards towards surface 22a along its radial path. As ring 8 is rotated in direction 24, tapered wedge 15 moves radially along tapered groove 22 and locking surface 22b pushes tapered wedge 15 up against locking surface 22a while locking surface 27 pushes down against protrusion 16. Since tapered wedge 15 is connected to both member 14 and radial ring 6, the upward movement of tapered wedge 15 towards locking surface 22a causes both member 14 and radial ring 6 to also move upwards. This upward movement additionally forces inward taper 17 into interior pocket 6a, thus forming an additional lock between members 19 and 14. Furthermore, tapered wedge 15 pushes up on locking surface 22a while locking surface 27 pushes down on protrusion 16, thus locking ring 8, member 14, and member 19 together.

FIG. 8 illustrates a typical bicycle. The major structural members of a bicycle are top tube 1, down tube 2, seat tube 3, head tube 4, rear stays 25, and chain stays 26. Head tube 4 forms the major component of the head tube assembly. The head tube assembly is made up of head tube 4, fork 9, stem 11, handlebar 10, and front wheel 5. The rear stays 25 and chain stays 26 meet together to hold the rear wheel 7. The seat tube 3 and chain stays 26 meet together at the bottom bracket 28. Additional components are installed onto the bicycle to make it a ride-able vehicle.

Figure 9:
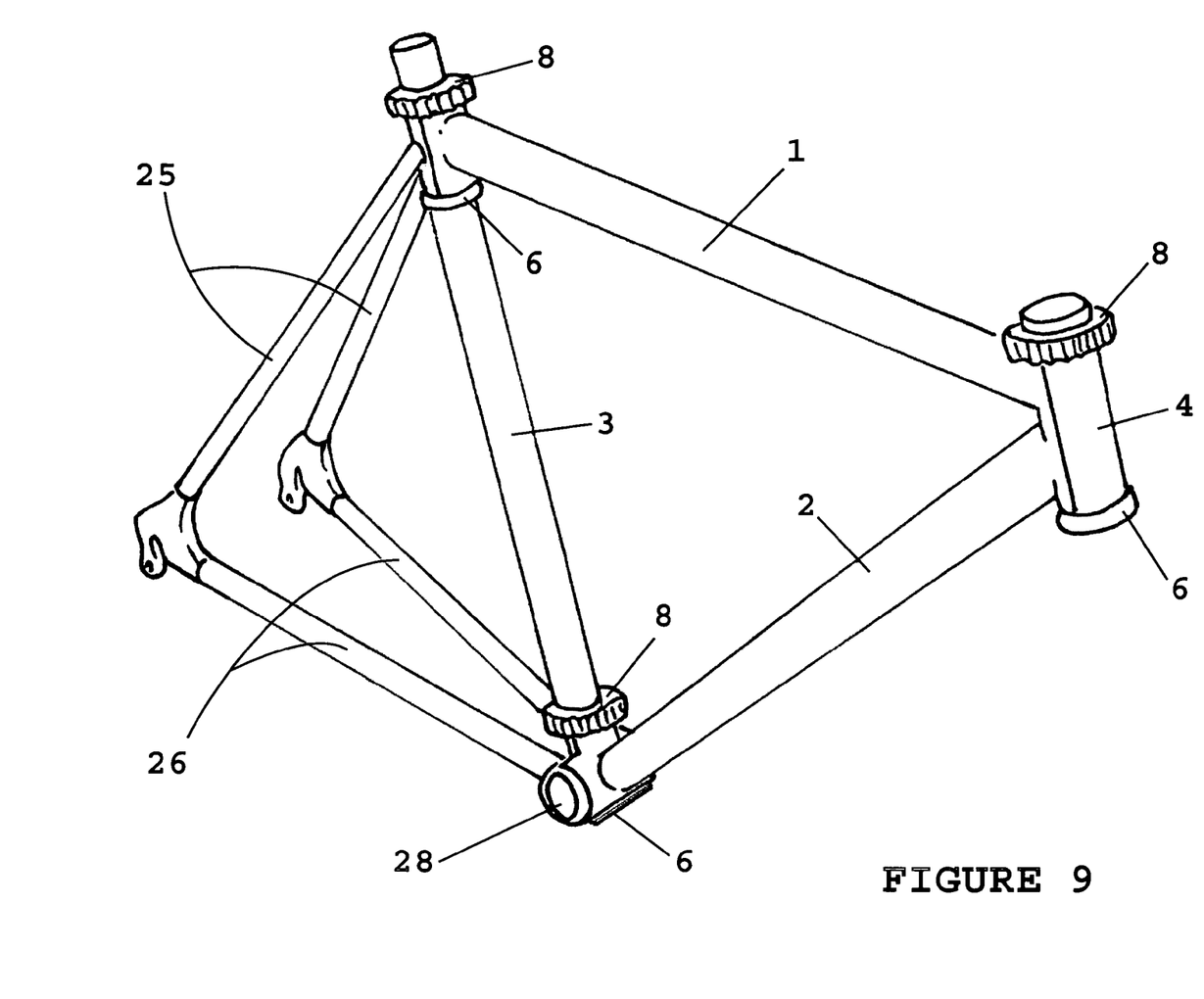
FIG. 9 shows an assembled bicycle frame making use of the preferred embodiment

FIG. 9 shows a standard bicycle frame making use of the preferred embodiment at four substantially transverse joint locations in the closed position. The preferred embodiment allows the temporary connection of top tube 1 to seat tube 3, top tube 1 to head tube 4, down tube 2 to head tube 4, and down tube 2 to seat tube 3. For added reinforcement and strength, the joint between down tube 2 and seat tube 3 overlaps bottom bracket 28. These joints allow the bicycle frame to be knocked down into smaller assemblies.

Figure 10:
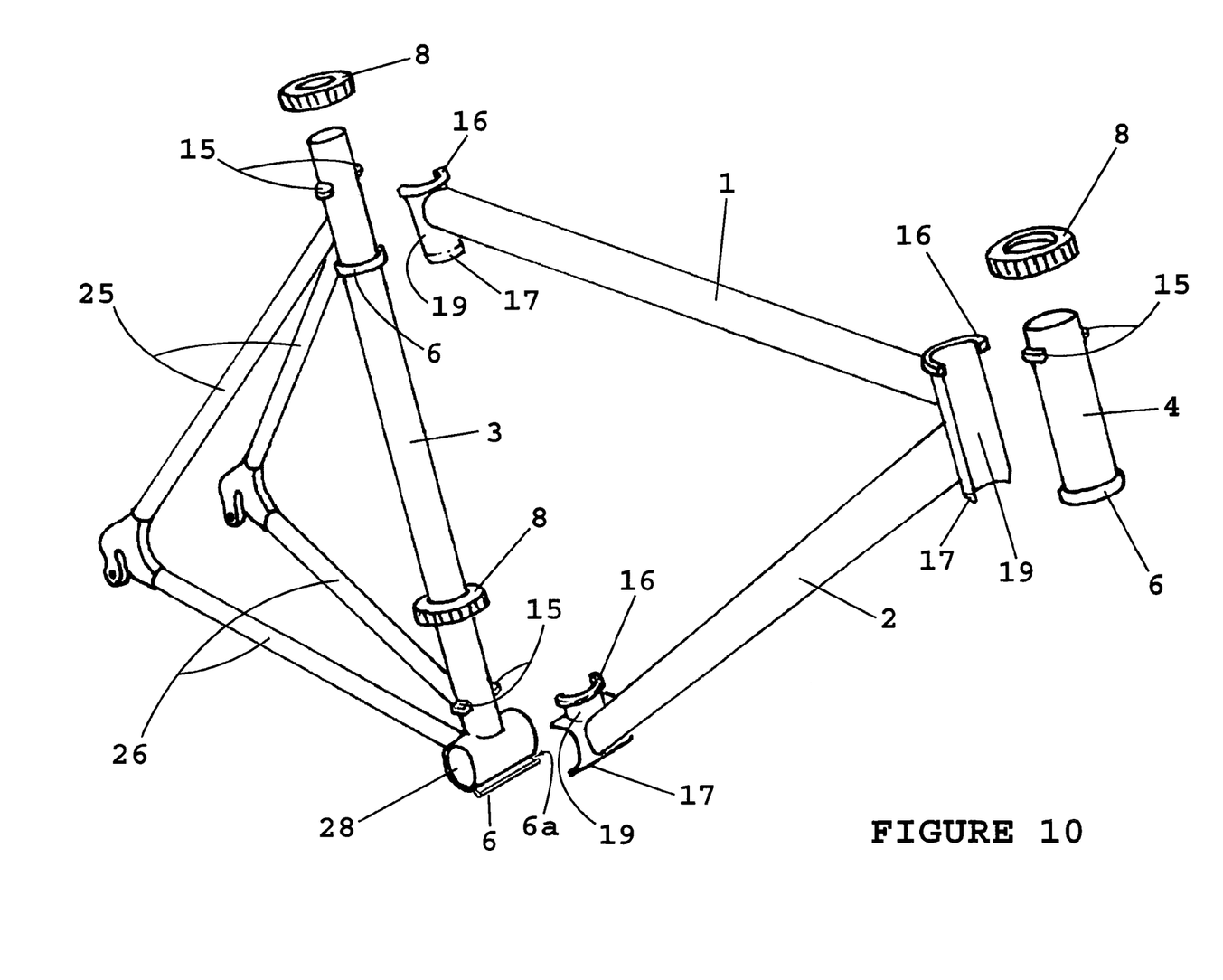
FIG. 10 shows the main structural assemblies of a disassembled bicycle frame and the parts of the preferred embodiment

FIG. 10 shows the sub-assemblies of a bicycle frame making use of the preferred embodiment at three distinct joint locations. The first assembly is made up of main structural member, head tube 4. Attached to head tube 4 are tapered wedge 15 and radial ring 6. The second assembly is made up of main structural members top tube 1 and down tube 2. Top tube 1 is attached to member 19 at the right side. Down tube 2 is also attached to member 19 at the right side. Formed on member 19 are protrusion 16 and inward taper 17. The inside surface of member 19 is designed to fit perfectly over the outside surface of head tube 4. As described in FIGS. 5 and 6, ring 8 is used to join members 19 and 14 together. Similarly in FIG. 10, ring 8 is used to join the first and second bicycle frame assemblies together by joining member 19 to head tube 4.

The third bicycle frame assembly is made up of main structural members seat tube 3, rear stays 25, chain stays 26, and bottom bracket 28. The third assembly joins to the second assembly at two joints. Each of these two joints makes use of the preferred embodiment in a substantially transverse orientation. The first joint connects top tube 1 to seat tube 3. Located at the top of seat tube 3 is tapered wedge 15 and radial ring 6. On the left side of top tube 1 is member 19 with inward taper 17 and protrusion 16. Ring 8 is axially located on seat tube 3 and connects top tube 1 to seat tube 3. The second joint connects down tube 2 to seat tube 3. To increase the overall strength of the bicycle frame, the second joint overlaps bottom bracket 28. Located at the bottom of seat tube 3 is tapered wedge 15. Below seat tube 3, an alternate version of ring 6 is attached to the bottom side of bottom bracket 28 creating inside pocket 6a. Attached to the bottom of down tube 2 is member 19. Member 19 is shaped to perfectly fit around the junction of bottom bracket 28 and seat tube 3. At the top of member 19 is protrusion 16 and at the bottom is inward taper 17. Inward taper 17 fits into pocket 6a on bottom bracket 28. Ring 8 is axially located on seat tube 3 and connects down tube 2 to both seat tube 3 and bottom bracket 28.

Making use of the preferred embodiment at these three distinct joints of the bicycle frame allows the bicycle frame to be knocked down into a very compact size enabling easy shipping, travel, and storage. Additionally, since head tube 4 has no major structural members fixed to it, the entire head tube assembly can be disconnected from the bicycle frame without the need to remove or adjust handlebars 10, stem 11, and fork 9 of FIG. 8. Keeping the head tube assembly together further adds to the simplicity and speed of dis-assembly and assembly. FIG. 10 illustrates one method of applying the preferred embodiment to three structural joints of a standard bicycle frame. However, the preferred embodiment can be applied to a standard bicycle frame design in a multitude of different configurations, making use of both in-line and transverse joint orientations, of which are not specifically described in the scope of this application.

I claim:
1. A quick-release coupling device comprising:
a. a first structural member (14) having two ends wherein an outer surface of a lower end includes a substantially annular ring with a circumferential upward facing channel axially fixed to said lower end and an upper end of said structural member having a plurality of radially outward tapered wedge protrusions (15);
b. a second structural member including a sleeve member (19) attached at one end, said sleeve member having an inner cylindrical surface for contacting said outside surface of said first structural member and wherein a lower end of said sleeve member having an inward taper and an upper end of said sleeve member having a radially outward protruding flange (16);
c. a rotatable locking ring having a radially outward helical retaining groove;
  i. said inward taper is inserted into said annular ring with said wedge protrusions rested on a top surface of said flange (16);
  ii. wherein said locking ring slidingly coupled to said upper end thereto for positively engaging/locking said flange and wedge protrusions.

2. A bicycle frame assembly utilizing a coupling device of claim 1 to connect one or more structural members of said frame assembly in substantially transverse and/or inline joint orientations.

* * * * *